(12) United States Patent
Yang

(10) Patent No.: US 7,414,865 B2
(45) Date of Patent: Aug. 19, 2008

(54) CONTROLLER HAVING OUTPUT CURRENT CONTROL FOR A POWER CONVERTER

(75) Inventor: Ta-Yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 139 days.

(21) Appl. No.: 11/280,309

(22) Filed: Nov. 17, 2005

(65) Prior Publication Data

US 2007/0109816 A1    May 17, 2007

(51) Int. Cl.
*H02M 3/335* (2006.01)
(52) U.S. Cl. .............. 363/21.16; 363/21.15; 363/21.07; 363/21.08
(58) Field of Classification Search .............. 363/21.12, 363/21.13, 21.14, 21.15, 21.16, 21.17, 21.18, 363/97
See application file for complete search history.

(56) References Cited

U.S. PATENT DOCUMENTS

| | | | | |
|---|---|---|---|---|
| 5,982,640 A * | 11/1999 | Naveed et al. | ........... | 363/21.15 |
| 5,986,897 A * | 11/1999 | Majid et al. | ............... | 363/21.16 |
| 6,061,257 A * | 5/2000 | Spampinato et al. | ...... | 363/21.13 |
| 6,445,598 B1 * | 9/2002 | Yamada | .................... | 363/21.12 |
| 6,519,165 B2 * | 2/2003 | Koike | ....................... | 363/21.12 |
| 6,611,439 B1 * | 8/2003 | Yang et al. | ..................... | 363/41 |
| 6,977,824 B1 * | 12/2005 | Yang et al. | ............... | 363/21.16 |
| 7,075,802 B2 * | 7/2006 | Yamashita | ............... | 363/21.12 |
| 2002/0039298 A1 * | 4/2002 | Riggio et al. | .................. | 363/22 |

* cited by examiner

*Primary Examiner*—Jeffrey L. Sterrett
*Assistant Examiner*—Stuart Hansen
(74) *Attorney, Agent, or Firm*—Rosenberg, Klein & Lee

(57) ABSTRACT

A controller controls the output current by measuring and controlling the switching current of the power converter. A first circuit generates a first signal in accordance with the switching current. A second circuit detects a discharge-time of the transformer. A third circuit generates a third signal by integrating the first signal with the discharge-time. The time constant of the third circuit is programmed and correlated with the switching period of the switching signal, therefore the third signal is proportional to the output current. A switching circuit generates a switching signal and controls the pulse width of the switching signal in accordance with the third signal and a reference voltage. Therefore, the output current of the power converter can be regulated.

10 Claims, 14 Drawing Sheets

US 7,414,865 B2

CONTROLLER HAVING OUTPUT CURRENT CONTROL FOR A POWER CONVERTER

BACKGROUND OF THE INVENTION

1. Field of the Invention

The present invention relates to a power converter, and more particularly, to an output current controller of the resonant power converter.

2. Description of Related Art

A variety of power converters have been widely used to provide regulated voltage and current. In order to precisely control the output current, traditionally a current detection circuit and output control circuit is equipped at the output of the power converter. However, a considerable power loss is normally consumed due to the output current detection circuit, particularly as the output current is high-level. Besides, this output control circuit takes a space of the PCB (print circuit board) and increases the cost of the power converter. Thus it is desirable to provide a controller that combines with the output control circuit of the power converter for the output current control. The switching current of the power converter is normally smaller than the output current. Therefore, the power converter saves the power losses by the switching current control instead of the output current control. Furthermore, this controller can be combined with the output control circuit as one integrated circuit, which dramatically reduced the space and cost of the power converter.

SUMMARY OF THE INVENTION

The present invention provides a controller to control an output current by controlling a switching current of a power converter. The controller comprises a first circuit to generate a first signal in response to the switching current of a transformer of the power converter. A second circuit is coupled to the transformer to generate a second signal in response to a discharging time of the transformer. A third circuit is used for generating a third signal by integrating the first signal with the second signal. A switching circuit generates a switching signal in response to the third signal and a reference voltage, in which the switching signal is used to switch the transformer and regulates the output current of the power converter. In order to achieve a precisely output current control, a time constant of the third circuit is designed to correlate to the switching frequency of the switching signal.

DESCRIPTION OF THE PREFERRED EMBODIMENTS

Figure 1:
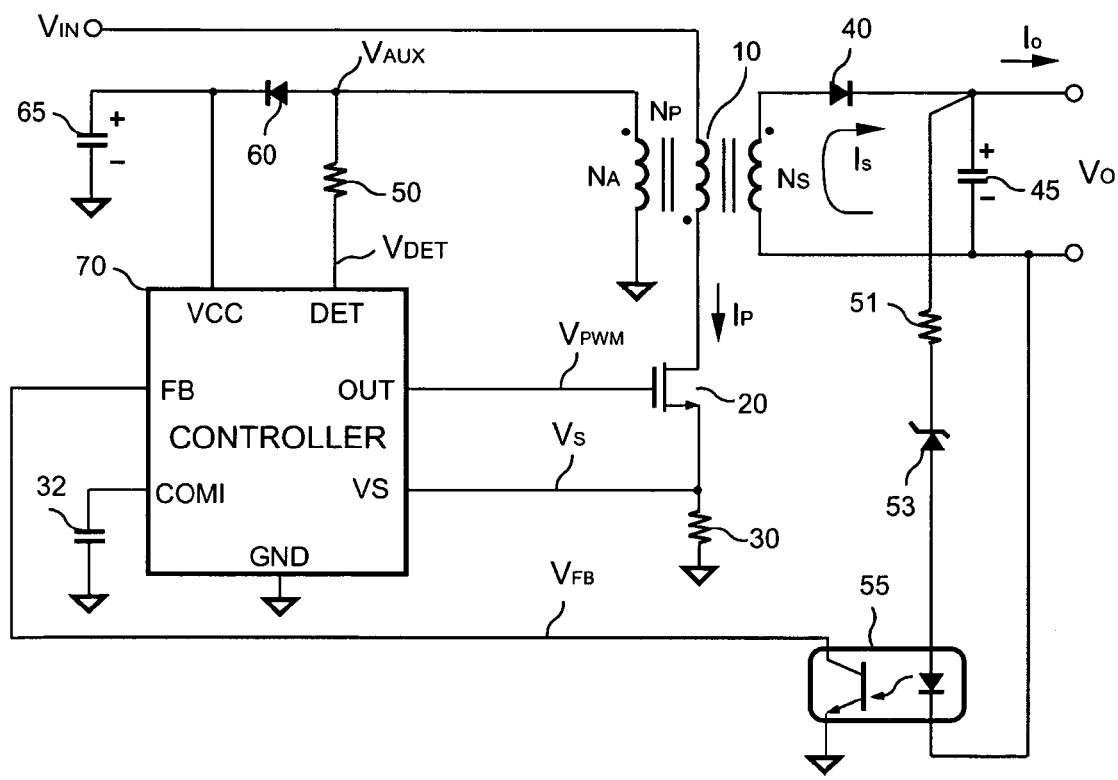
FIG. 1 shows a circuit diagram of a resonant power converter according to one embodiment of the present invention.
Figure 2:
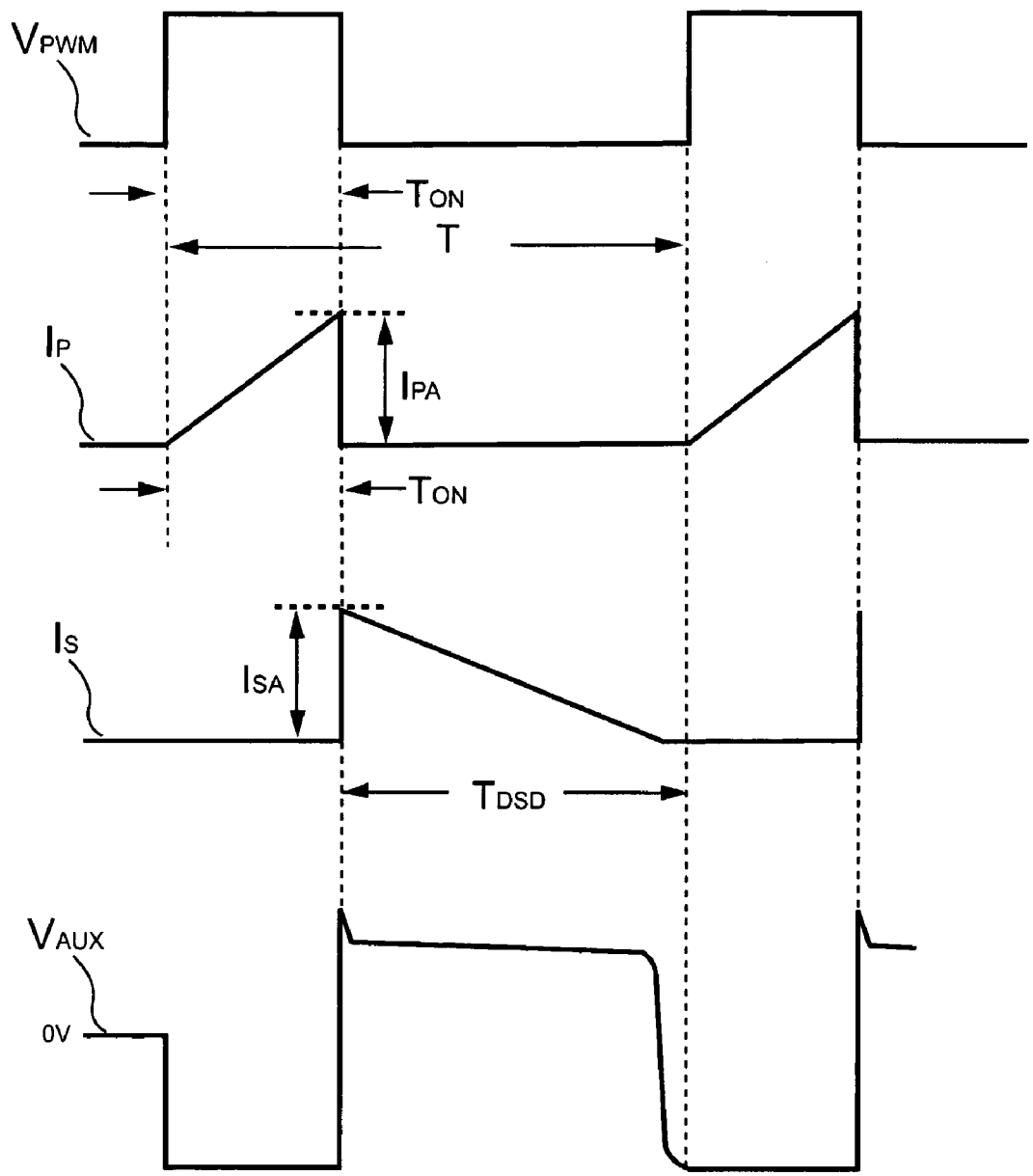
FIG. 2 shows the waveforms diagram of the resonant power converter according to one embodiment of the present invention.

Referring to FIG. 1, a resonant power converter according to one embodiment of the present invention is illustrated. The resonant power converter comprises a transformer 10 having an auxiliary winding $N_A$, a primary winding $N_P$ and a secondary winding $N_S$. In order to regulate the output voltage $V_O$ and the output current $I_O$ of the power converter, a controller 70 generates a switching signal $V_{PWM}$ to switch the transformer 10 through a power transistor 20. Referring to FIG. 2, it illustrates waveforms of the resonant power converter in FIG. 1. A primary side switching current $I_P$ is generated as the switching signal $V_{PWM}$ becomes a high-level. A peak value $I_{PA}$ of the primary side switching current $I_P$ is given by, $$I_{PA} = \frac{V_{IN}}{L_P} \times T_{ON} \qquad (1)$$

where $V_{IN}$ is an input voltage applied to the transformer 10, $L_P$ is the inductance of the primary winding $N_P$ of the transformer 10, $T_{ON}$ is an on-time of the switching signal $V_{PWM}$.

Once the switching signal $V_{PWM}$ drops to a low-level, the stored energy in the transformer 10 will be delivered to the secondary side of the transformer 10 and to an output of the power converter via a rectifier 40. The rectifier 40 connects to a filter capacitor 45. A peak value $I_{SA}$ of a secondary side switching current $I_S$ can be expressed by, $$I_{SA} = \frac{(V_O + V_F)}{L_S} \times T_{DSD} \qquad (2)$$

where $V_O$ is the output voltage of the power converter, $V_F$ is the forward voltage dropped across the rectifier 40, $L_S$ is the inductance of the secondary winding $N_S$ of the transformer 10, and $T_{DSD}$ is a discharging time of the secondary side switching current $I_S$.

Meanwhile, a reflected voltage $V_{AUX}$ is generated at the auxiliary winding $N_A$ of the transformer 10. The reflected voltage $V_{AUX}$ can be given by, $$V_{AUX} = \frac{T_{NA}}{T_{NS}} \times (V_O + V_F) \qquad (3)$$

$$I_{SA} = \frac{T_{NP}}{T_{NS}} \times I_{PA} \quad (4)$$

where $T_{NA}$ and $T_{NS}$ are the winding turns of the auxiliary winding $N_A$ and the secondary winding $N_S$ of the transformer 10 respectively.

As the secondary side switching current $I_S$ falls to zero, the reflected voltage $V_{AUX}$ will start to decrease. This also indicates that the stored energy of the transformer 10 is fully discharged at this moment. Therefore, as shown in FIG. 2, the discharging time $T_{DSD}$ in equation (2) can be measured from the falling edge of the switching signal $V_{PWM}$ to the falling point of the reflected voltage $V_{AUX}$. The resonant power converter features that the stored energy of the transformer 10 is fully released before the next switching cycle starts.

Referring to FIG. 1, the controller 70 comprises a supply terminal VCC, a voltage-detection terminal DET, a ground terminal GND, a current-sense terminal VS, a feedback terminal FB, an output terminal OUT and a current-compensation terminal COMI. The output terminal OUT outputs the switching signal $V_{PWM}$. The voltage-detection terminal DET is coupled to the auxiliary winding $N_A$ via a resistor 50 for detecting the reflected voltage $V_{AUX}$. The reflected voltage $V_{AUX}$ further charges a supplied capacitor 65 via a rectifier 60 to supply power to the controller 70. A current-sense resistor 30 is connected from a source of the power transistor 20 to the ground for converting the primary side switching current $I_P$ to a primary side switching current signal $V_S$. The current-sense terminal VS is coupled to a current-sense device such as the current-sense resistor 30. An optical-coupler 55 is coupled between the secondary side of the transformer 10 and the feedback terminal FB to form a feedback control loop. The output voltage conducted through a resistor 51 and a Zener voltage of a Zener diode 53 drive the input of the optical-coupler 55 for deriving a feedback signal $V_{FB}$ from the output of the optical-coupler 55. The feedback signal $V_{FB}$ is transmitted to the feedback terminal FB. The current-compensation terminal COMI connects a compensation capacitor 32.

Figure 3:
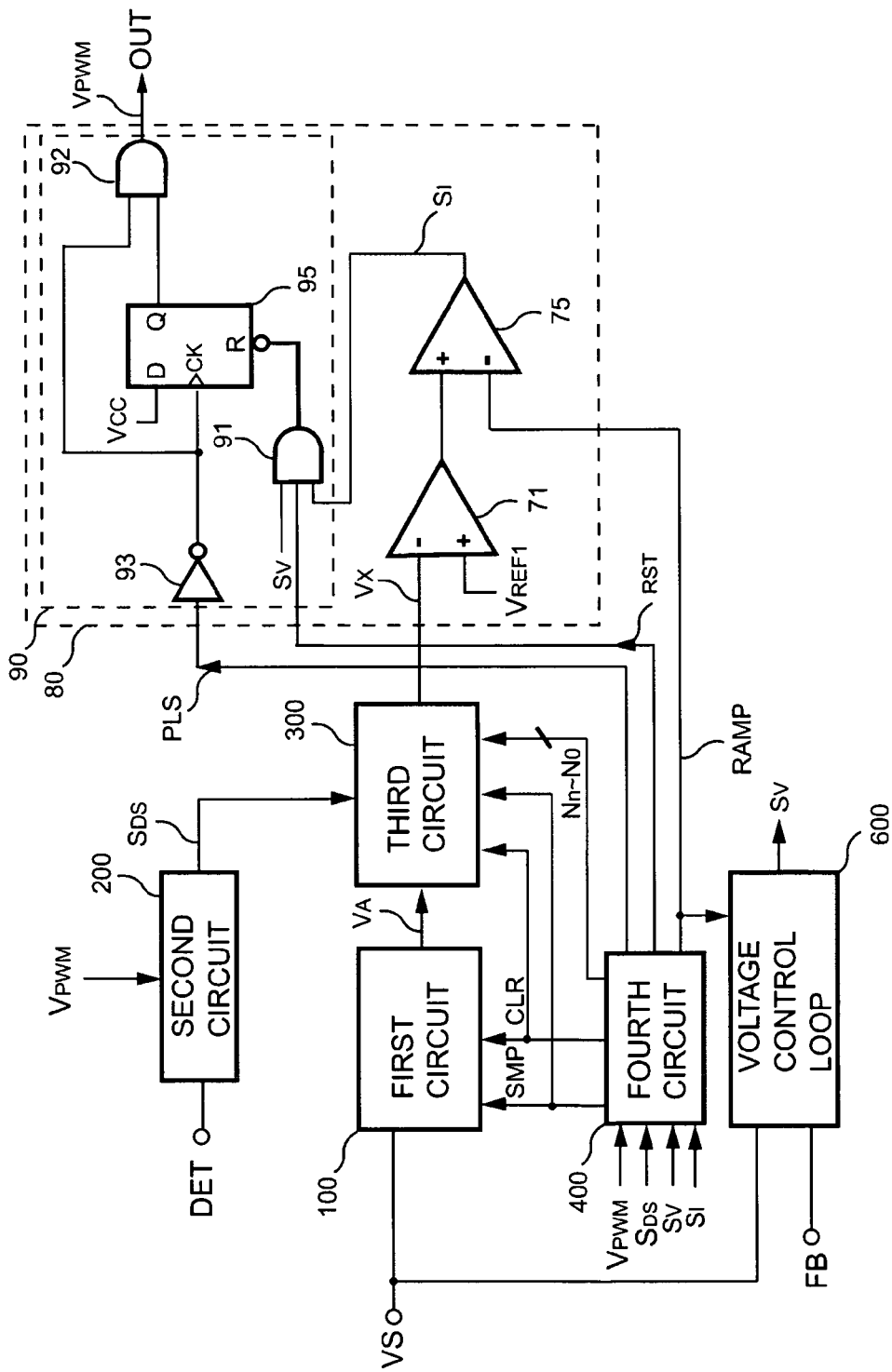
FIG. 3 shows a circuit diagram of a controller according to one preferred embodiment of the present invention.

Referring to FIG. 3, it shows a circuit diagram of the controller 70 for output current control according to one embodiment of the present invention. A first circuit 100 generates a first signal $V_A$ by sampling the primary side switching current signal $V_S$. A second circuit 200 detects the discharging time $T_{DSD}$ of the secondary side switching current $I_S$ via detecting the discharge time of the transformer 10. A fourth circuit 400 generates a set signal PLS to determine the switching frequency of the switching signal $V_{PWM}$. A third circuit 300 is used to generate a third signal $V_X$ by integrating the first signal $V_A$ with the discharging time $T_{DSD}$. A time constant of the third circuit 300 is correlated with a switching period T of the switching signal $V_{PWM}$. The third signal $V_X$ is therefore proportional to the output current $I_O$ of the power converter.

A switching circuit 80 includes a first operational amplifier 71 and a reference voltage $V_{REF1}$ developing an error amplifier for output current control, a first comparator 75 associated with a first flip-flop 95 through a first AND gate 91 for controlling the pulse width of the switching signal $V_{PWM}$ in response to an output of the error amplifier. The error amplifier amplifies the third signal $V_X$ and provides a loop gain for output current control. A current control loop is formed from detecting the primary side switching current $I_P$ to modulate the pulse width of the switching signal $V_{PWM}$. The current control loop controls the magnitude of the primary side switching current $I_P$ in response to the reference voltage $V_{REF1}$. The secondary side switching current $I_S$ is a ratio of the primary side switching current $I_P$ as shown in equation (4). Referring to the waveform in FIG. 2, the output current $I_O$ of the power converter is the average of the secondary side switching current $I_S$. The output current $I_O$ of the power converter can be expressed by, $$I_O = I_{SA} \times \frac{T_{DS}}{2T} \quad (5)$$

where $T_{DS}$ represents the discharge time of the transformer, it is equal to the $T_{DSD}$. The output current $I_O$ of the power converter is therefore regulated.

Referring to FIG. 3, the primary side switching current $I_P$ is converted to the primary side switching current signal $V_S$ by the current-sense resistor 30. The first circuit 100 detects the primary side switching current signal $V_S$ and generates the first signal $V_A$. The third circuit 300 generates a third signal $V_X$ by integrating the first signal $V_A$ with the discharging time $T_{DSD}$. The third signal $V_X$ is designed by, $$V_X = \frac{V_A}{2} \times \frac{T_{DS}}{T_1} \quad (6)$$

where $V_A$ can be expressed by, $$V_A = \frac{T_{NS}}{T_{NP}} \times R_S \times I_{SA} \quad (7)$$

where the $T_1$ is the time constant of the third circuit 300, $R_S$ is the resistance of the current-sense resistor 30.

Referring to equations (4)-(7), the third signal $V_X$ can be rewritten as, $$V_X = \frac{T}{T_1} \times \frac{T_{NS}}{T_{NP}} \times R_S \times I_O \quad (8)$$

It is noted that the third signal $V_X$ is proportional to the output current $I_O$ of the power converter. The third signal $V_X$ increases whenever the output current $I_O$ increases. However, the maximum value of the third signal $V_X$ is limited to the value of the reference voltage $V_{REF1}$ through the regulation of the current control loop. Under feedback control of the current control loop, a maximum output current $I_{O(MAX)}$ is given by, $$I_{O(MAX)} = \frac{T_{NP}}{T_{NS}} \times \frac{G_A \times G_{SW} \times V_{R1}}{1 + \left(G_A \times G_{SW} \times \frac{R_S}{K}\right)} \quad (9)$$

where K is a constant and equal to $T_1/T$, $V_{R1}$ is the value of the reference voltage $V_{REF1}$, $G_A$ is the gain of the error amplifier, and $G_{SW}$ is the gain of the switching circuit 80.

If the loop gain of the current control loop is high ($G_A \times G_{SW} \gg 1$), the maximum output current $I_{O(MAX)}$ could be given by, $$I_{O(MAX)} = K \times \frac{T_{NP}}{T_{NS}} \times \frac{V_{R1}}{R_S} \qquad (10)$$

Figure 4:
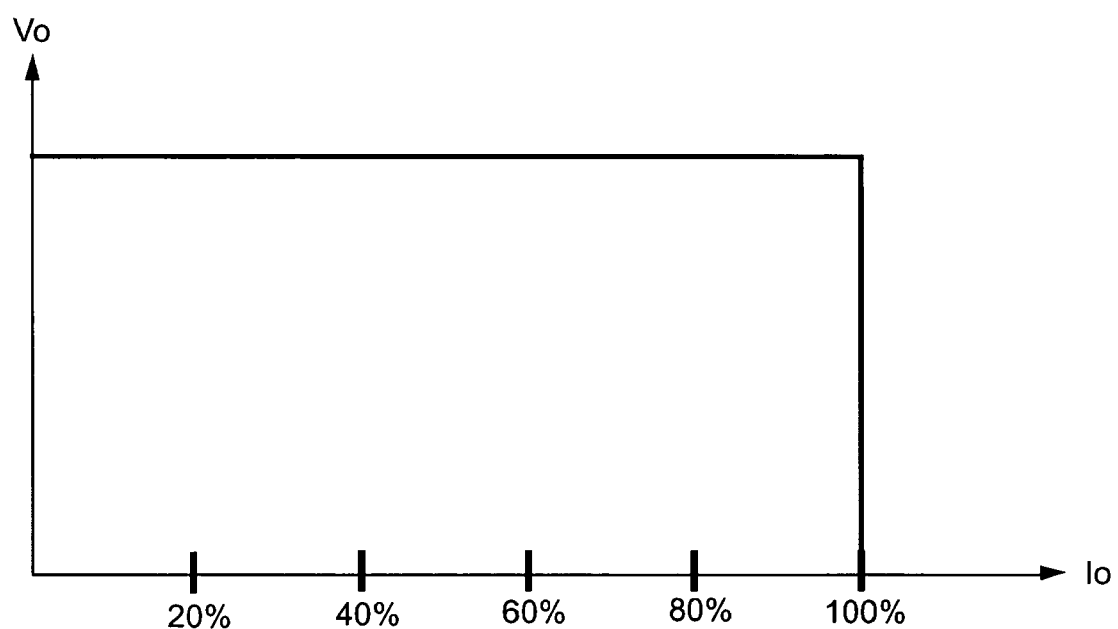
FIG. 4 shows a curve of the output voltage versus the variation of the output current according to one embodiment of the present invention.

The maximum output current $I_{O(MAX)}$ of the power converter is thus regulated as a constant current in accordance with the reference voltage $V_{REF1}$. FIG. 4 shows a curve of the output voltage $V_O$ versus the variation of the output current $I_O$.

The switching circuit 80 further includes an output circuit 90. The output circuit 90 includes the first flip-flop 95, which outputs the switching signal $V_{PWM}$ for switching the power converter. The first flip-flop 95 is set by the set signal PLS through a first inverter 93. An input of a second AND gate 92 is connected to an output Q of the first flip-flop 95. Another input of the second AND gate 92 is connected to an output of the first inverter 93. An output of the second AND gate 92 is connected to the output terminal OUT of the controller 70. The first flip-flop 95 is reset by an output of the first AND gate 91. A first input of the first AND gate 91 is supplied with a voltage-loop signal $S_V$. The voltage-loop signal $S_V$ is generated by a voltage control loop 600. The voltage control loop 600 is utilized to regulate the output voltage $V_O$ of the power converter. A current-loop signal $S_I$ generated from an output of the first comparator 75 is supplied to a second input of the first AND gate 91 for achieving output current control. A third input of the first AND gate 91 is coupled to the fourth circuit 400 for receiving a first reset signal RST. Wherein the current-loop signal $S_I$ and the voltage-loop signal $S_V$ are a second reset signal and a third reset signal respectively. The first reset signal RST, the current-loop signal $S_I$, and the voltage-loop signal $S_V$ can reset the first flip-flop 95 for shorten the pulse width of the switching signal $V_{PWM}$ so as to regulate the output voltage $V_O$ and the output current $I_O$. A positive input of the first comparator 75 is coupled to an output of the first operational amplifier 71. A negative input of the first comparator 75 is supplied with a ramp signal RAMP that is provided by the fourth circuit 400.

Figure 5:
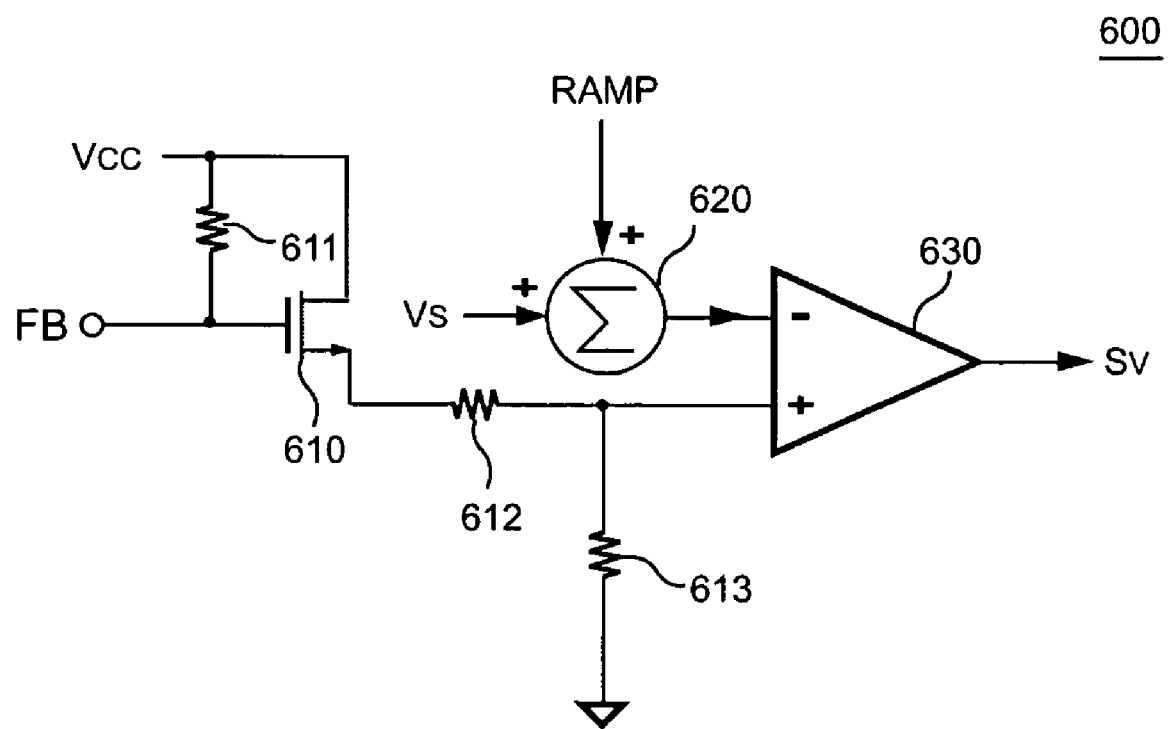
FIG. 5 shows a circuit diagram of a voltage control loop according to one embodiment of the present invention.

Referring to FIG. 5, it shows a circuit diagram of the voltage control loop 600 according to one embodiment of the present invention. The voltage control loop 600 comprises a second transistor 610, three resistors 611,612,613, a summing circuit 620, and a second comparator 630. The gate of the second transistor 610 is connected to the feedback terminal FB. The resistor 611 is coupled between the supply voltage $V_{CC}$, the drain of the second transistor 610 and the gate of the second transistor 610. The resistor 612 is coupled to the source of the second transistor 610. The resistor 613 is coupled between the resistor 612 and the ground. A positive input of the second comparator 630 is connected to the feedback terminal FB through the second transistor 610 and resistors 612,613 for level shift and attenuation. A negative input of the second comparator 630 is coupled to an output of the summing circuit 620 to receive the sum of the ramp signal RAMP and the primary side switching current signal $V_S$. The summing circuit 620 is applied to add the primary side switching current signal $V_S$ with the ramp signal RAMP for the slope compensation. The voltage-loop signal $S_V$ is thus generated from the output of the second comparator 630 for the voltage feedback control and regulating the output voltage $V_O$ of the power converter.

Figure 6:
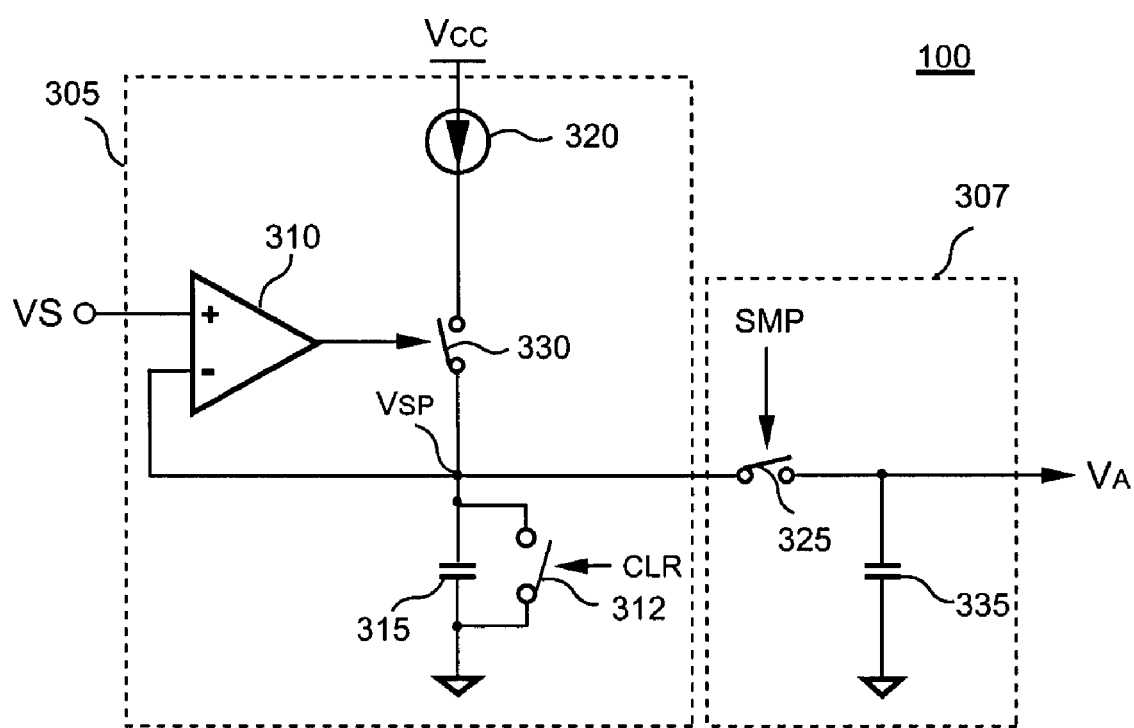
FIG. 6 shows a circuit diagram of a first circuit according to one embodiment of the present invention.

Referring to FIG. 6, it illustrates a circuit diagram of the first circuit 100 according to one embodiment of the present invention. The first circuit 100 comprises a peak detector 305 and a first sample circuit 307. The peak detector 305 includes a third comparator 310, a first constant current source 320, a first switch 330, a second switch 312 and a fourth capacitor 315. The third comparator 310 has a positive input coupled to the current-sense terminal VS. The value of the primary side switching current signal $V_S$ is proportional to the value of the primary side switching current $I_P$. A negative input of the third comparator 310 is coupled to the fourth capacitor 315. The fourth capacitor 315 is used to hold the peak value of the primary side switching current signal $V_S$. The first constant current source 320 is coupled to the supply voltage $V_{CC}$ and applied to charge the fourth capacitor 315. The first switch 330 is coupled between the first constant current source 320 and the fourth capacitor 315. The first switch 330 is turned on/off by the output of the third comparator 310. A peak signal $V_{SP}$ is thus generated across the fourth capacitor 315. The peak signal $V_{SP}$ is proportional to the peak value $I_{PA}$ of the primary side switching current $I_P$ as shown in FIG. 2. The second switch 312 is coupled in parallel with the fourth capacitor 315 to discharge the fourth capacitor 315. The second switch 312 is turned on/off by a clear signal CLR that is generated by the fourth circuit 400. The first sample circuit 307 includes a third switch 325 and a fifth capacitor 335. The third switch 325 is coupled between the fourth capacitor 315 and the fifth capacitor 335. The third switch 325 is used for periodically sampling the peak signal $V_{SP}$ from the fourth capacitor 315 to the fifth capacitor 335. Then the first signal $V_A$ is obtained across the fifth capacitor 335. The third switch 325 is turned on/off by a latch signal SMP that is generated by the fourth circuit 400.

Figure 7:
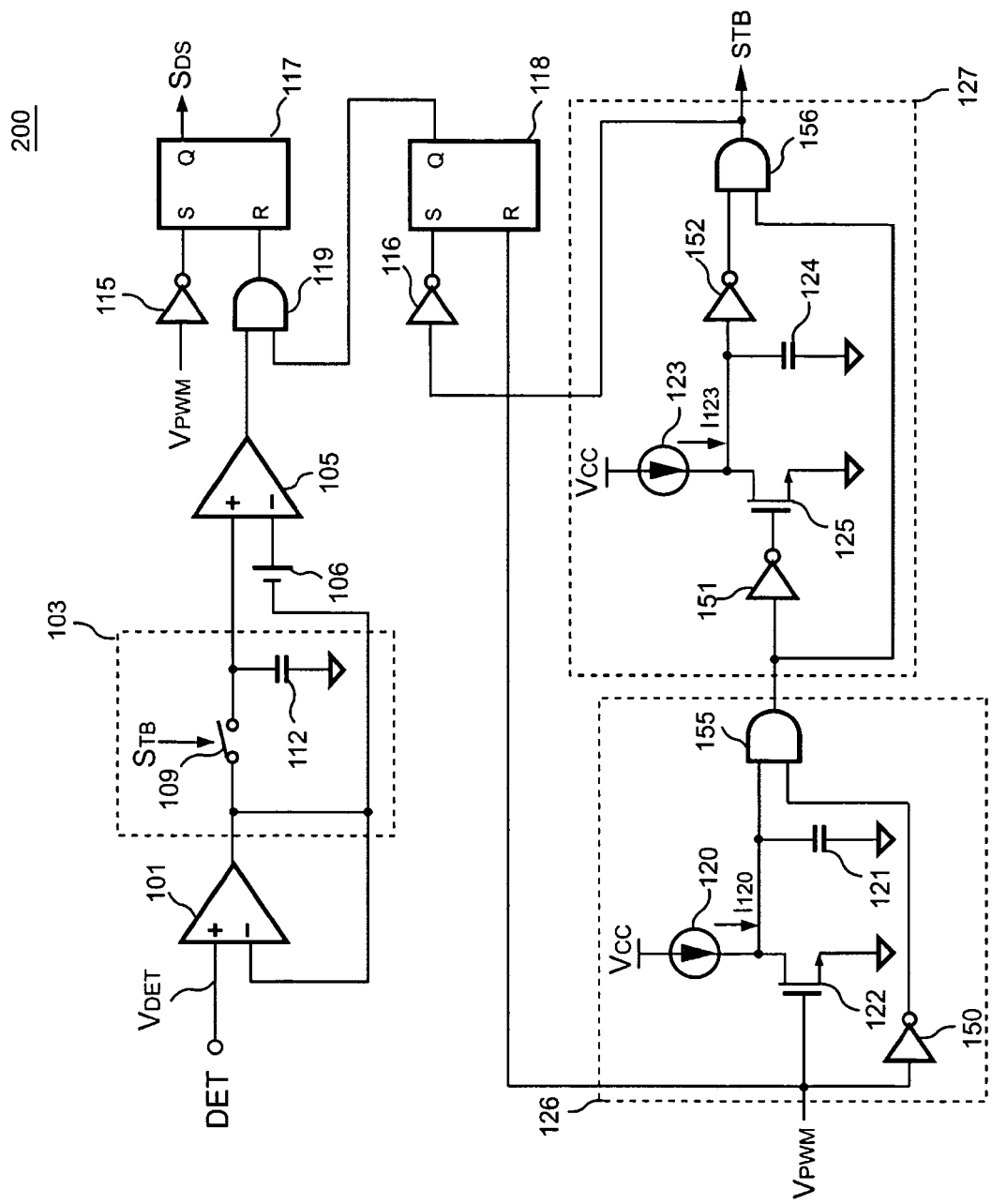
FIG. 7 shows a circuit diagram of a second circuit according to one embodiment of the present invention.

Referring to FIG. 7, it illustrates a circuit diagram of the second circuit 200 according to one embodiment of the present invention. The second circuit 200 comprises a first time-delay circuit 126 and a first one-shot signal generator 127. The first time-delay circuit 126 includes a second inverter 150, a third transistor 122, a second constant current source 120, a sixth capacitor 121 and a third AND gate 155. The second constant current source 120 is connected between the drain of the third transistor 122 and the supply voltage $V_{CC}$. The gate of the third transistor 122 receives the switching signal $V_{PWM}$. The source of the third transistor 122 is coupled to the ground. The sixth capacitor 121 is connected between the drain of the third transistor 122 and the ground. An input of the third AND gate 155 is connected to the sixth capacitor 121. Another input of the third AND gate 155 is connected to an output of the second inverter 150. An input of the second inverter 150 receives the switching signal $V_{PWM}$. An input of the first time-delay circuit 126 is supplied with the switching signal $V_{PWM}$. The first time-delay circuit 126 provides a propagation delay for the falling edge of the switching signal $V_{PWM}$. A current $I_{120}$ of the second constant current source 120 and the capacitance of the sixth capacitor 121 determine the timing of the propagation delay.

The first one-shot signal generator 127 includes a third inverter 151, a fourth inverter 152, a fourth transistor 125, a third constant current source 123, a seventh capacitor 124 and a fourth AND gate 156 for generating a voltage-sample signal STB. An input of the one-shot signal generator 127 is coupled to an output of the time-delay circuit 126, which is also an output of the third AND gate 155. An output of the third inverter 151 is coupled to the gate of the fourth transistor 125. The third constant current source 123 is connected between the drain of the fourth transistor 125 and the supply voltage $V_{CC}$. The source of the fourth transistor 125 is coupled to the ground. The seventh capacitor 124 is connected between the drain of the fourth transistor 125 and the ground. An input of the fourth inverter 152 is connected to the seventh capacitor 124. An output of the fourth inverter 152 is coupled to an input of the fourth AND gate 156. Another input of the fourth AND gate 156 is coupled to the output of the third AND gate 155. An output of the fourth AND gate 156 outputs the voltage-sample signal STB. A current $I_{123}$ of the third constant current source 123 and the capacitance of the seventh capacitor 124 determine the pulse width of the voltage-sample signal STB.

A second operational amplifier 101 performs as a buffer amplifier. A negative input and an output of the second operational amplifier 101 are coupled together. A positive input of the second operational amplifier 101, which is also an input of the buffer amplifier, is coupled to the voltage-detection terminal DET. The voltage-detection terminal DET is coupled to the auxiliary winding $N_A$ of the transformer 10 via the resistor 50 for detecting the reflected voltage $V_{AUX}$. A second sample circuit 103 includes a fourth switch 109 and an eighth capacitor 112 for obtaining the discharge time of the transformer 10. The fourth switch 109 is coupled between an output of the buffer amplifier and the eighth capacitor 112. The fourth switch 109 is turned on/off by the voltage-sample signal STB. Therefore, the reflected voltage $V_{AUX}$ is sampled as a detecting voltage $V_{DET}$, which is also a sample signal. The detecting voltage $V_{DET}$ will be held across the eighth capacitor 112.

A fourth comparator 105 is utilized to detect the decrease of the reflected voltage $V_{AUX}$. A positive input of the fourth comparator 105 is coupled to the eighth capacitor 112. An offset voltage 106 is coupled between a negative input of the fourth comparator 105 and the output of the buffer amplifier to provide a threshold for detecting the decrease of the reflected voltage $V_{AUX}$. Therefore, the fourth comparator 105 outputs an ending signal in a high-level as the decrement of the reflected voltage $V_{AUX}$ is beyond the voltage of the offset voltage 106. An input of a fifth inverter 115 is supplied with the switching signal $V_{PWM}$. An input of a sixth inverter 116 is supplied with the voltage-sample signal STB. A fifth AND gate 119 has a first input connected to an output of the fourth comparator 105. A second flip-flop 117 and a third flip-flop 118 have a rising-edge triggered set-input and a high-level triggered reset-input respectively. The set-input of the third flip-flop 118 is coupled to an output of the sixth inverter 116. The reset-input of the third flip-flop 118 is supplied with the switching signal $V_{PWM}$. An output of the third flip-flop 118 is coupled to a second input of the fifth AND gate 119. An output of the second flip-flop 117 outputs the second signal $S_{DS}$. The set-input of the second flip-flop 117 is also coupled to the output of the fifth inverter 115, so that the second signal $S_{DS}$ is enabled in response to the off-state of the switching signal $V_{PWM}$. The reset-input of the second flip-flop 117 is coupled to an output of the fifth AND gate 119, so that the second signal $S_{DS}$ is disabled in response to the ending signal. The pulse width of the second signal $S_{DS}$ is correlated to the discharge-time $T_{DS}$ of the transformer 10.

Figure 8:
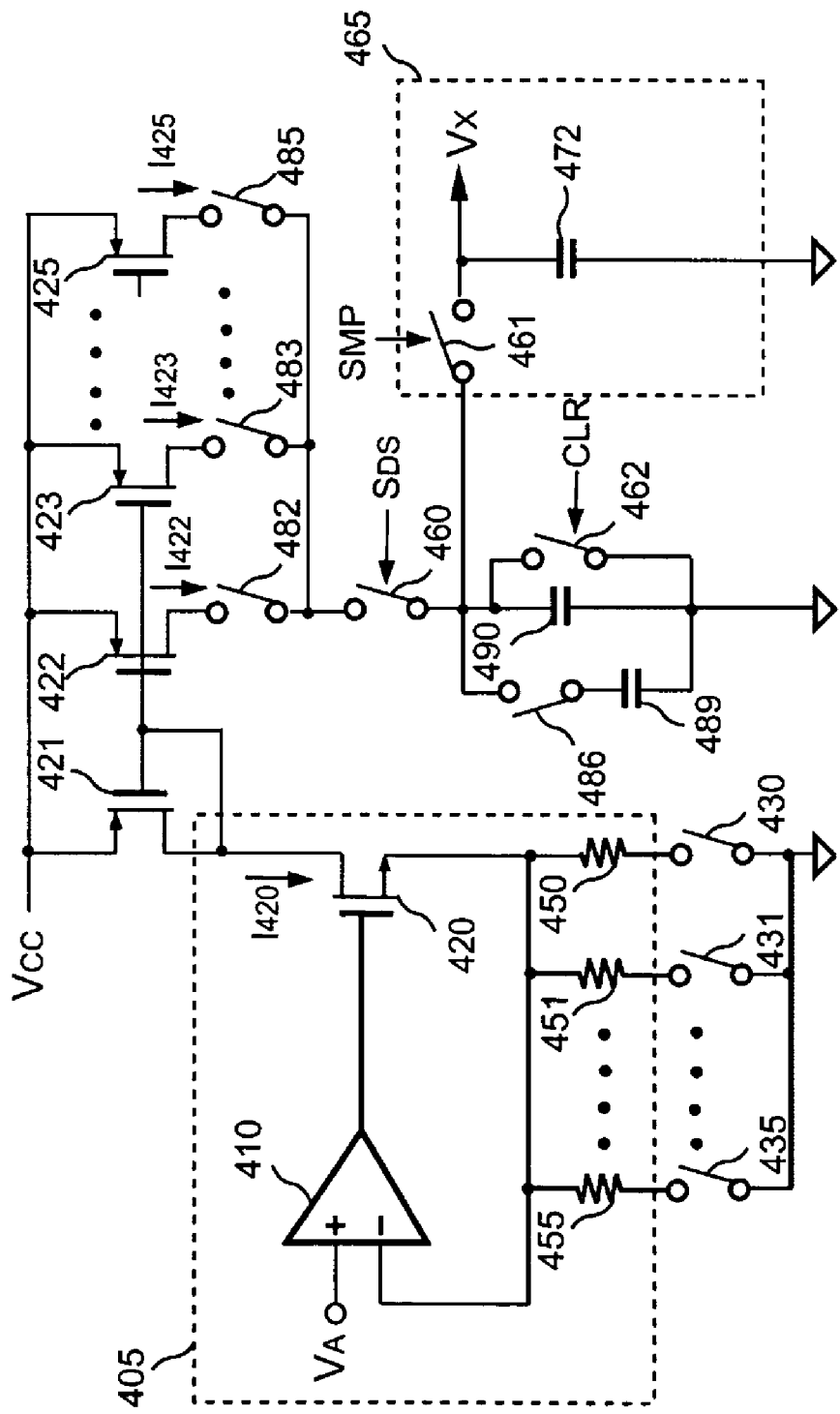
FIG. 8 shows a circuit diagram of a third circuit according to one embodiment of the present invention.

Referring to FIG. 8, it illustrates a circuit diagram of a third circuit 300 according to one embodiment of the present invention. The third circuit 300 comprises a voltage-to-current converter 405. The voltage-to-current converter 405 includes a third operational amplifier 410, resistors 450-455 and a fifth transistor 420 to generate a first current $I_{420}$ in response to the voltage of the first signal $V_A$. The first current $I_{420}$ is a programmable current. A positive input of the third operational amplifier 410 receives the first signal $V_A$. A negative input of the third operational amplifier 410 is coupled to the resistors 450-455 and the source of the fifth transistor 420. An output of the third operational amplifier 410 is coupled to the gate of the fifth transistor 420. The drain of the fifth transistor 420 is coupled to the drain of the transistor 421, and outputs the first current $I_{420}$. Current mirrors include transistors 421-425 for producing currents $I_{422}$-$I_{425}$ by mirroring the first current $I_{420}$. The sources of the transistors 421-425 and the supply voltage $V_{CC}$ are coupled together. The gates of the transistors 421-425 and the drain of the transistor 421 are coupled together. The resistors 450-455, a ninth capacitors 489 and a tenth capacitor 490 determine the time constant of the third circuit 300.

A fifth switch 460 is coupled between the currents $I_{422}$-$I_{425}$ and the capacitors 489, 490. The fifth switch 460 is turned on only during the period of the discharge time $T_{DS}$ that is represented by the second signal $S_{DS}$. A sixth switch 462 is coupled in parallel with the capacitors 489, 490 to discharge the capacitor 489, 490. The sixth switch 462 is turned on/off by the clear signal CLR that is generated by the fourth circuit 400. A seventh switch 486 is coupled between the ninth capacitors 489 and the fifth switch 460. A third sample circuit 465 includes an eighth switch 461 and an output capacitor 472. The eighth switch 461 is coupled between capacitor 489, 490 and the output capacitor 472. The eighth switch 461 is turned on/off by the latch signal SMP that is generated by the fourth circuit 400. The eighth switch 461 serves to periodically sample the voltage across the capacitor 489, 490 to the output capacitor 472. The third signal $V_X$ is therefore generated across the output capacitor 472. The third signal $V_X$ can be expressed by $$V_X = \frac{1}{R_X C_X} \times V_A \times T_{DS} \qquad (11)$$

wherein the Rx is the resistance of the resistors 450-455; the Cx is the capacitance of the capacitors 489, 490.

In order to correlate the time constant ($R_X$, $C_X$) of the third circuit 300 with the switching frequency of the switching signal $V_{PWM}$, the resistance of the resistors 450-455, the capacitance of the capacitors 489, 490 and the currents $I_{422}$-$I_{425}$ are programming by the switches 430-435, switches 462, 486 and switches 482-485 respectively. The switches 430-435 are coupled between the resistors 450-455 and the ground respectively. The switches 482-485 are coupled between the drains of the transistors 422-425 and the fifth switch 460. The switches 430-435 and 482-486 are controlled by a fourth signal Nn~N₀ that is generated by the fourth circuit 400.

Figure 9:
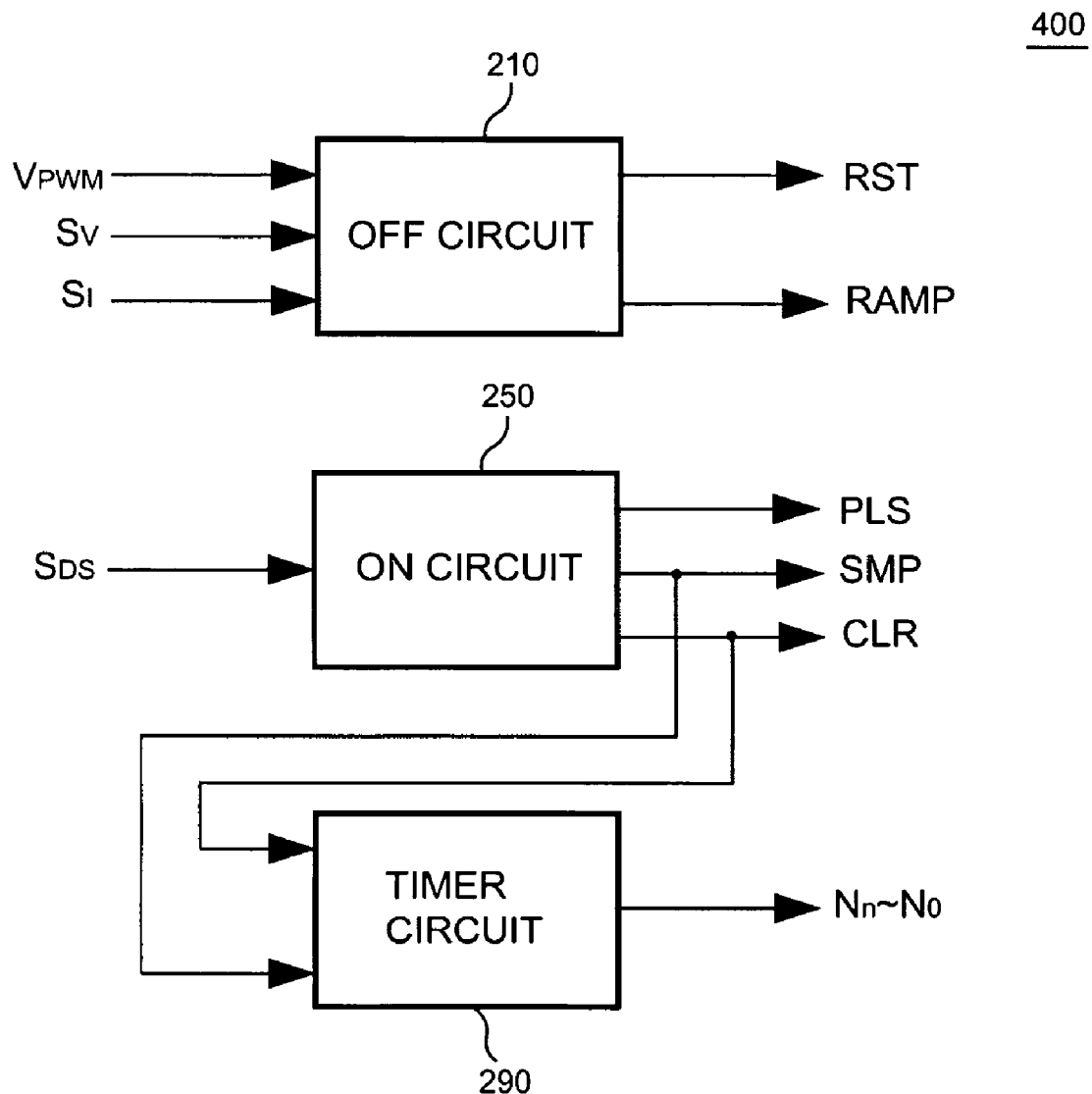
FIG. 9 shows a circuit diagram of a fourth circuit according to one embodiment of the present invention.

Referring to FIG. 9, it illustrates a circuit diagram of the fourth circuit 400 according to one embodiment of the present invention. The fourth circuit 400 comprises an off circuit 210, an on circuit 250 and a timer circuit 290. The on circuit 250 generates the set signal PLS in response to the end of the second signal $S_{DS}$, in which the on circuit 250 further generates the clear signal CLR and the latch signal SMP in response to the set signal PLS. The off circuit 210 is used to generate the ramp signal RAMP during the on-period of the switching signal $V_{PWM}$ and generate the first reset signal RST in response to the ramp signal RAMP to determine the maximum on time of the switching signal $V_{PWM}$. The timer circuit 290 generates the fourth signal Nn☐N₀ in response to the clear signal CLR and the latch signal SMP.

Figure 10:
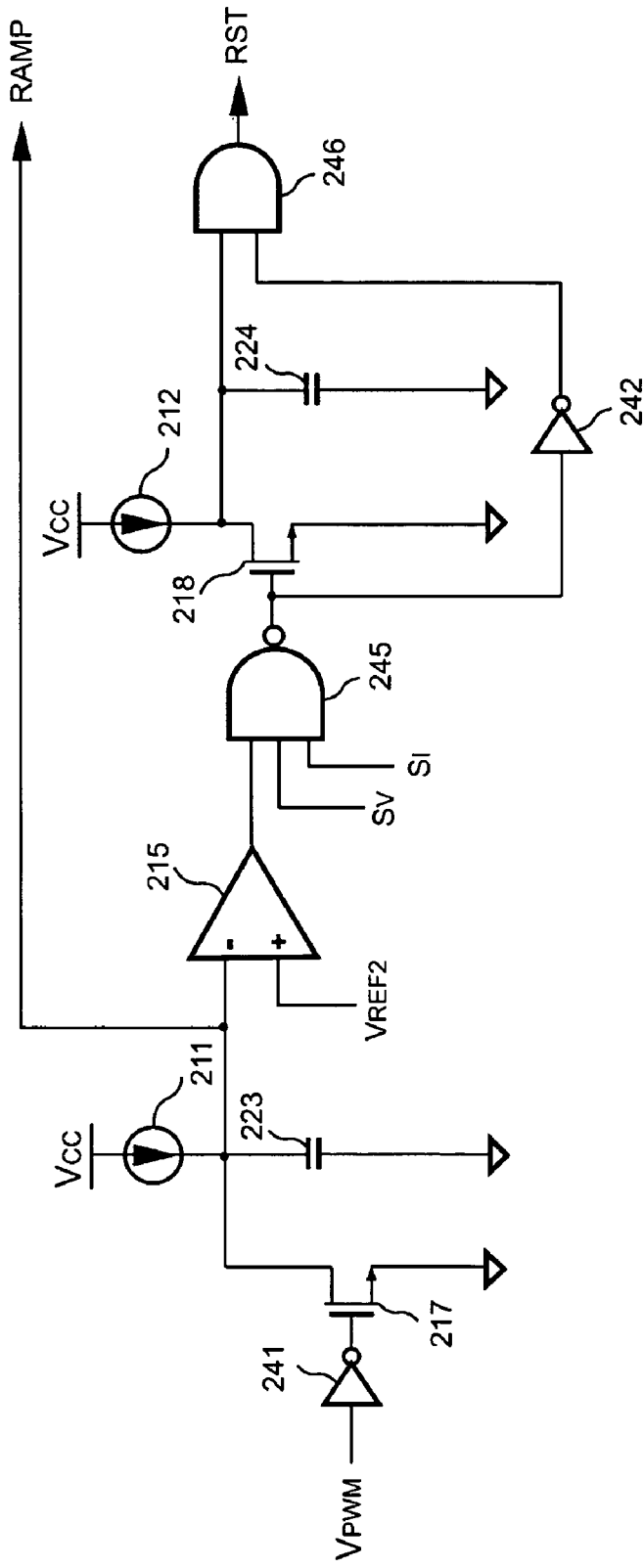
FIG. 10 shows a circuit diagram of an off circuit of the fourth circuit according to the present invention.

FIG. 10 illustrates the circuit diagram of the off circuit 210 of the fourth circuit 400 according to the present invention. An input of a seventh inverter 241 receives the switching signal $V_{PWM}$. An output of the seventh inverter 241 is coupled to the gate of a sixth transistor 217. A fourth constant current source 211 is coupled between the drain of the sixth transistor 217 and supply voltage $V_{CC}$. The source of the sixth transistor 217 is coupled to the ground. An eleventh capacitor 223 is coupled between the fourth constant current source 211 and the ground. The fourth constant current source 211 and the eleventh capacitor 223 generate the ramp signal RAMP in response to the on-state of the switching signal $V_{PWM}$. A fifth comparator 215 with a reference voltage $V_{REF2}$ generates the first reset signal RST to determine the maximum on time of the switching signal $V_{PWM}$. A positive input of the fifth comparator 215 is supplied with the reference voltage $V_{REF2}$. A negative input of the fifth comparator 215 is coupled to the eleventh capacitor 223. An output of the fifth comparator 215 is coupled to a first input of a first NAND gate 245. A second input and a third input of the first NAND gate 245 receive the voltage loop signal $S_V$ and the current loop signal $S_I$ respectively. An output of the first NAND gate 245 is coupled to the gate of a seventh transistor 218. The source of the seventh transistor 218 is coupled to the ground. A fifth constant current source 212 is coupled between the supply voltage $V_{CC}$ and the drain of the seventh transistor 218. A twelfth capacitor 224 is connected between the drain of the seventh transistor 218 and the ground. An input of a sixth AND gate 246 is coupled to the twelfth capacitor 224. Another input of the sixth AND gate 246 is coupled to an output of an eighth inverter 242. An input of the eighth inverter 242 is coupled to the output of the first NAND gate 245. An output of the sixth AND gate 246 outputs the first reset signal RST. The fifth constant current source 212 and the twelfth capacitor 224 ensure a minimum pulse width of the first reset signal RST.

Figure 11:
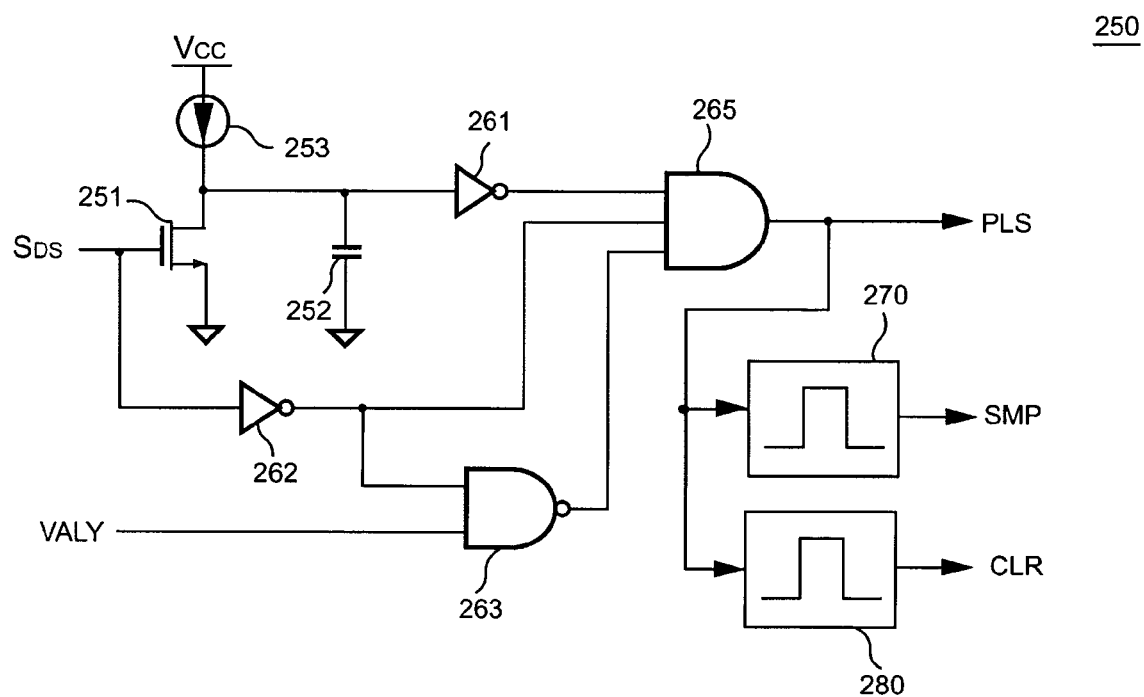
FIG. 11 shows a circuit diagram of an on circuit of the fourth circuit according to the present invention.
Figure 12:
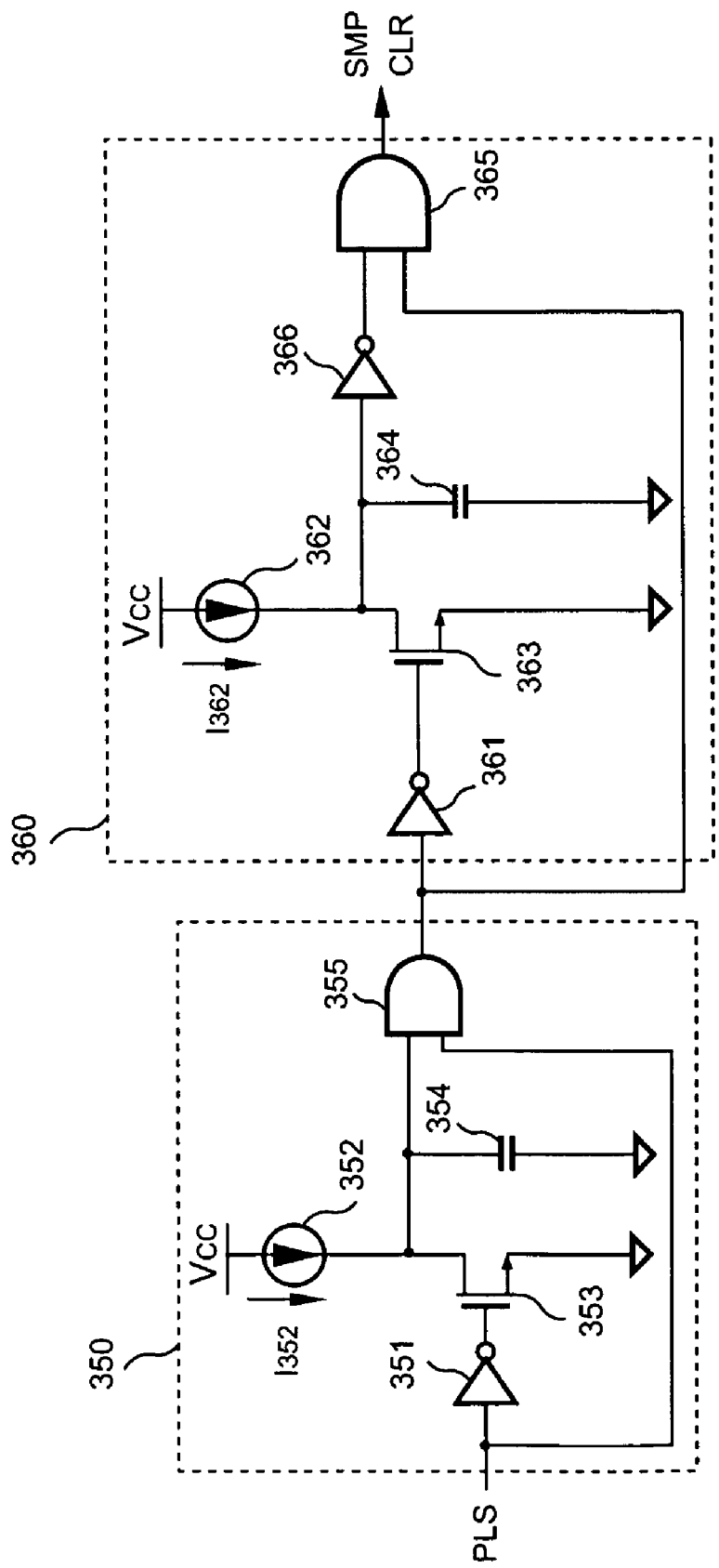
FIG. 12 shows a circuit diagram of a pulse generator of the on circuit according to the present invention.

FIG. 11 illustrates the circuit diagram of the on circuit 250 of the fourth circuit 400 according to the present invention. The gate of an eighth transistor 251 receives the second signal $S_{DS}$. The source of the eighth transistor 251 is coupled to the ground. A sixth constant current source 253 is coupled between the supply voltage $V_{CC}$ and the drain of the eighth transistor 251. A thirteenth capacitor 252 is coupled between the drain of the eighth transistor 251 and the ground. An input of a ninth inverter 261 is coupled to the thirteenth capacitor 252. An output of the ninth inverter 261 is coupled to a first input of a seventh AND gate 265. An input of a tenth inverter 262 receives the second signal $S_{DS}$. An output of the tenth inverter 262 is coupled to a second input of the seventh AND gate 265 and an input of a second NAND gate 263. Another input of the second NAND gate 263 receives a valley detection signal VALY. An output of the second NAND gate 263 is coupled to a third input of the seventh AND gate 265. An output of the seventh AND gate 265 generates the set signal PLS. The seventh AND gate 265 is utilized to produce the set signal PLS, in which the set signal PLS is generated in response to the off-state of the second signal $S_{DS}$ and the enable of an optional valley detection signal VALY. The valley detection signal VALY is applied to turn on the switching signal $V_{PWM}$ for synchronizing with the resonant frequency of the power converter and achieving the soft switching. The sixth constant current source 253 and the thirteenth capacitor 252 determine the pulse width of the set signal PLS. The latch signal SMP and the clear signal CLR are generated in response to the set signal PLS through a first pulse generator 270 and a second pulse generator 280. FIG. 12 shows the circuit diagram of the pulse generator 270 and 280, and the FIG. 13 shows the timing and the waveforms of the set signal PLS, the latch signal SMP and the clear signal CLR.

Referring to FIG. 12, the pulse generator comprises a second time-delay circuit 350 and a second one-shot signal generator 360. The second time-delay circuit 350 includes a eleventh inverter 351, a seventh constant current source 352, a ninth transistor 353, a fourteenth capacitor 354 and a eighth AND gate 355. An input of the eleventh inverter 351 receives the set signal PLS. An output of the eleventh inverter 351 is coupled to the gate of the ninth transistor 353. The seventh constant current source 352 is connected between the drain of the ninth transistor 353 and the supply voltage $V_{CC}$. The source of the ninth transistor 353 is coupled to the ground. The fourteenth capacitor 354 is connected between the drain of the ninth transistor 353 and the ground. An input of the eighth AND gate 355 is connected to the fourteenth capacitor 354. Another input of the eighth AND gate 355 receives the set signal PLS. A current $I_{352}$ of the seventh constant current source 352 and the capacitance of the fourteenth capacitor 354 determine the timing of the propagation delay.

The second one-shot signal generator 360 includes a twelfth inverter 361, an eighth constant current source 362, a tenth transistor 363, a fifteenth capacitor 364, a ninth AND gate 365 and a thirteenth inverter 366. An input of the twelfth inverter 361 is coupled to the output of the eighth AND gate 355. An output of the twelfth inverter 361 is coupled to the gate of the tenth transistor 363. The eighth constant current source 362 is connected between the drain of the tenth transistor 363 and the supply voltage $V_{CC}$. The source of the tenth transistor 363 is coupled to the ground. The fifteenth capacitor 364 is connected between the drain of the tenth transistor 363 and the ground. An input of the thirteenth inverter 366 is connected to the fifteenth capacitor 364. An output of the thirteenth inverter 366 is coupled to an input of the ninth AND gate 365. Another input of the ninth AND gate 365 is coupled to the output of the eighth AND gate 355. An output of the ninth AND gate 365 outputs the latch signal SMP or the clear signal CLR. A current $I_{362}$ of the eighth constant current source 362 and the capacitance of the fifteenth capacitor 364 determine the pulse width of the latch signal SMP or the clear signal CLR.

Figure 13:
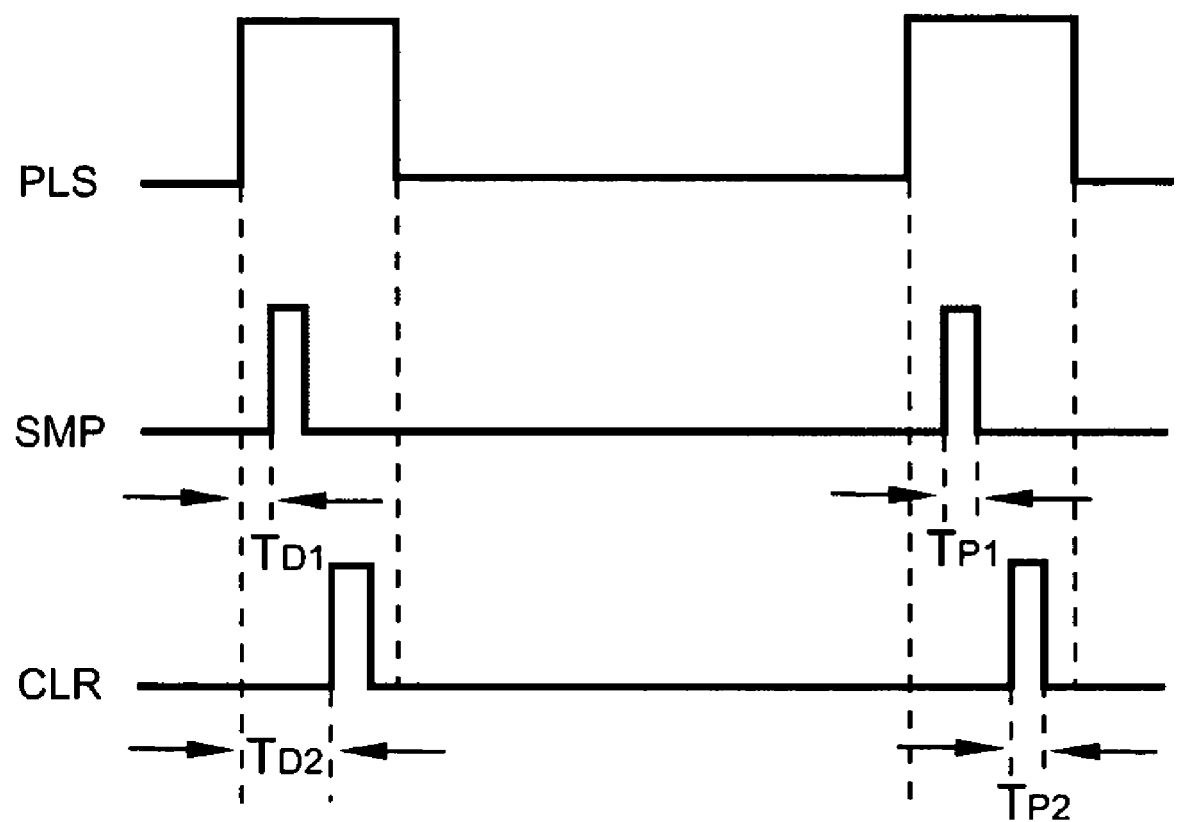
FIG. 13 shows the waveforms of the on circuit according to the present invention.

FIG. 13 shows the waveforms of the on circuit 250 according to the present invention. A first delay time $T_{D1}$ is produced by the first pulse generator 270 in response to the rising edge of the set signal PLS. After that, the latch signal SMP is generated as a one-shot signal having a first pulse width $T_{P1}$. In the mean time, the rising edge of the set signal PLS drives the second pulse generator 280 to produce a second delay time $T_{D2}$ and the clear signal CLR with a second pulse width $T_{P2}$. The second delay time $T_{D2}$ is longer than the first delay time $T_{D1}$.

Figure 14:
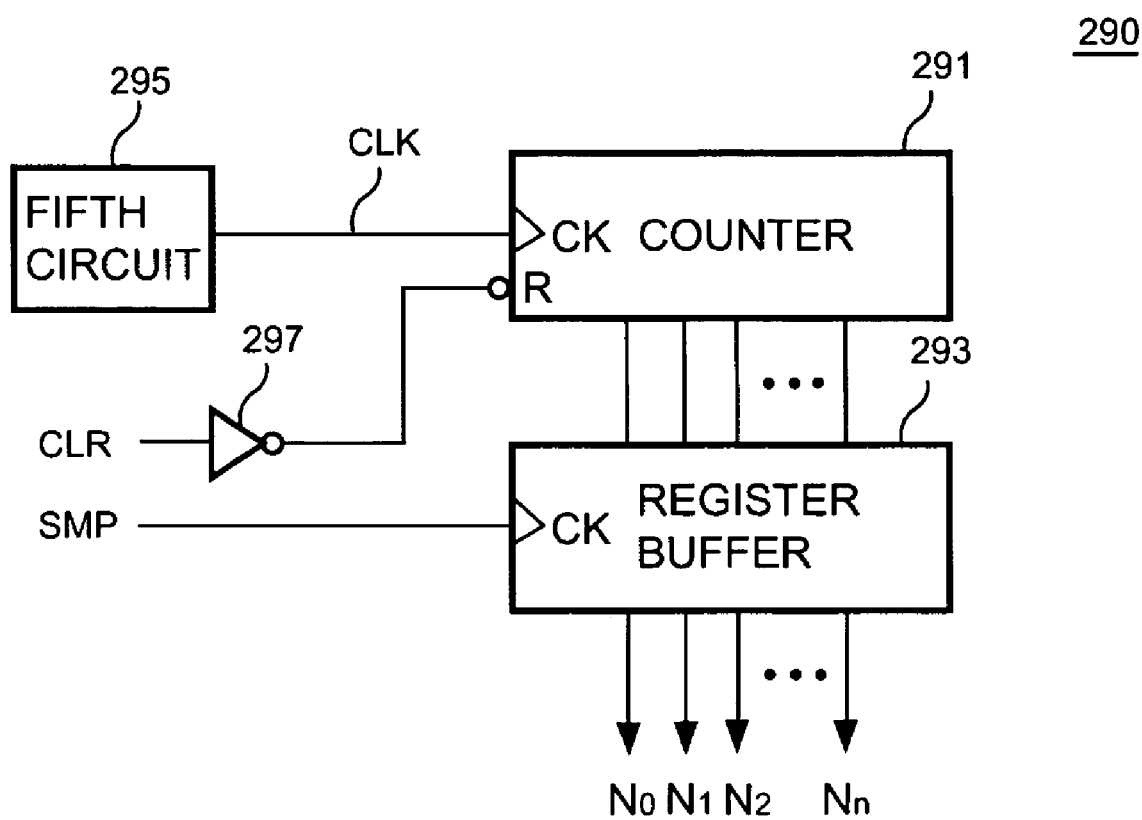
FIG. 14 shows a circuit diagram of a timer circuit of the fourth circuit according to the present invention.

FIG. 14 illustrates the circuit diagram of the timer circuit 290 of the fourth circuit 400 according to the present invention. The timer circuit 290 includes a counter 291, a register buffer 293, a fifth circuit 295 and a fourteenth inverter 297. An input of the fourteenth inverter 297 receives the clear signal CLR. An output of the fourteenth inverter 297 is coupled to the counter 291. The fifth circuit 295 generates a clock signal CLK. The counter 291 is coupled to generate a binary code in response to the clock signal CLK and the clear signal CLR. The register buffer 293 is coupled to generate the fourth signal $N_n\sim N_0$ by sampling the binary code in response to the latch signal SMP. A time constant $(R_Y C_Y)$ of the fifth circuit 295 is correlated with the time constant $(R_X C_X)$ of the third circuit 300, and the binary code of the counter 291 represents a switching period of the switching signal $V_{PWM}$. Therefore, the switching period T of the switching signal $V_{PWM}$ can be determined as, $$T = R_Y \times C_Y \times N_{Count} \quad (12)$$

where $N_{COUNT}$ is the value of the fourth signal $N_n\sim N_0$.

Accordingly, the third signal $V_X$ is correlated to the secondary side switching current $I_S$ and the output current $I_O$ of the power converter. Thus, the equation (8) and (11) can be rewritten as, $$V_X = m \times \frac{T_{NS}}{T_{NP}} \times R_S \times I_O \quad (13)$$

where m is a constant, which can be determined by, $$m = \frac{R_Y \times C_Y}{R_X \times C_X} \times N_{Count} \quad (14)$$

Since the time constant $R_X C_X$ is controlled and programmed in accordance with the fourth signal $N_n \sim N_0$. The value of $(R_Y C_Y \times N_{COUNT})$ is equal to the value of $R_X C_X$. Therefore, the third signal $V_X$ is proportional to the output current $I_O$ of the power converter.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A controller for a power converter, comprising:
   a first circuit coupled to a current sense device of said power converter to generate a first signal in response to a switching current of a transformer of said power converter;
   a second circuit coupled to said transformer to generate a second signal in response to a discharging time of said transformer;
   a third circuit generating a third signal by integrating said first signal with said second signal; and
   a switching circuit generating a switching signal in response to said third signal and a reference voltage, wherein said switching signal is used to switch said transformer for regulating an output current of said power converter, said switching circuit including:
     an amplifier receiving said reference voltage and said third signal to generate an error signal;
     a comparator receiving said error signal and a ramp signal to generate a second reset signal; and
     an output circuit turning on said switching signal in response to a set signal, and turning off said switching signal in response to a first reset signal or said second reset signal.

2. The controller as claimed in claim 1, wherein a time constant of said third circuit is correlated to a switching frequency of said switching signal.

3. The controller as claimed in claim 1, further comprising a fourth circuit for generating a fourth signal in response to a switching frequency of said switching signal, wherein said fourth signal is used to program a time constant of said third circuit for the integration.

4. The controller as claimed in claim 3, wherein said fourth circuit generates a set signal after the end of said second signal and outputs a ramp signal during the on-period of said switching signal, wherein said fourth circuit further generates a first reset signal in response to said ramp signal to determine the maximum on time of said switching signal.

5. The controller as claimed in claim 4, said fourth circuit comprising:
   an on circuit, generating said set signal in response to the end of said second signal, wherein said on circuit generates a clear signal and a latch signal in response to said set signal;
   an off circuit, generating said ramp signal during the on-period of said switching signal, wherein said off circuit generates said first reset signal to determine the maximum on time of said switching signal in response to said ramp signal; and
   a timer circuit, generating said fourth signal in response to said clear signal and said latch signal.

6. The controller as claimed in claim 5, said timer circuit comprising:
   a fifth circuit, generating a clock signal;
   a counter, generating a binary code in response to said clock signal and said clear signal; and
   a register buffer, generating said fourth signal by sampling said binary code in response to said latch signal;
   wherein a time constant of said fifth circuit is correlated with a time constant of said third circuit, and said binary code of said counter represents a switching period of said switching signal.

7. The controller as claimed in claim 1, said first circuit comprising:
   a peak detector, coupled to said current sense device to generate a peak signal in response to the peak values of said switching current; and
   a first sample circuit, connected to said peak detector to generate said first signal by sampling said peak signal.

8. A controller for a power converter, comprising:
   a first circuit coupled to a current sense device of said power converter to generate a first signal in response to a switching current of a transformer of said power converter;
   a second circuit coupled to said transformer to generate a second signal in response to a discharging time of said transformer, said second circuit including:
     a sample circuit coupled to said transformer to generate a sample signal by sampling a reflected voltage of said transformer for obtaining said discharging time of said transformer;
     a comparator having an input terminal coupled to said transformer through an offset voltage for detecting said reflected voltage of said transformer, another input terminal of said comparator receiving said sample signal, wherein an output of said comparator outputs an ending signal; and
     a flip-flop, generating said second signal in response to a switching signal and said ending signal, wherein said second signal is enabled in response to the off-state of said switching signal, and said second signal is disabled in response to said ending signal;
   a third circuit generating a third signal by integrating said first signal with said second signal; and
   a switching circuit generating said switching signal in response to said third signal and a reference voltage, wherein said switching signal is used to switch said transformer for regulating an output current of said power converter.

9. A controller for a power converter, comprising:
   a first circuit coupled to a current sense device of said power converter to generate a first signal in response to a switching current of a transformer of said power converter;
   a second circuit coupled to said transformer to generate a second signal in response to a discharging time of said transformer;

a third circuit generating a third signal by integrating said first signal with said second signal, said third circuit including:

a capacitor generating said third signal;

a converter generating a first current for charging said capacitor in response to said first signal;

a switch coupled between said first current and said capacitor to enable or disable said first current for charging said capacitor, wherein the on/off-state of said switch is controlled by said second signal; and a third sample circuit coupled to said capacitor to generate said third signal by sampling a voltage across said capacitor;

wherein a resistor of said converter, said capacitor and said first current determine a time constant of said third circuit; and, a switching circuit generating a switching signal in response to said third signal and a reference voltage, wherein said switching signal is used to switch said transformer for regulating an output current of said power converter.

10. The controller as claimed in claim 9, wherein the resistance of said resistor, or the capacitance of said capacitor or the current of said first current are determined by a fourth signal.

* * * * *